P. COLLYER.
Fruit-Gatherer.
No 5,156.
Patented June 12, 1847.
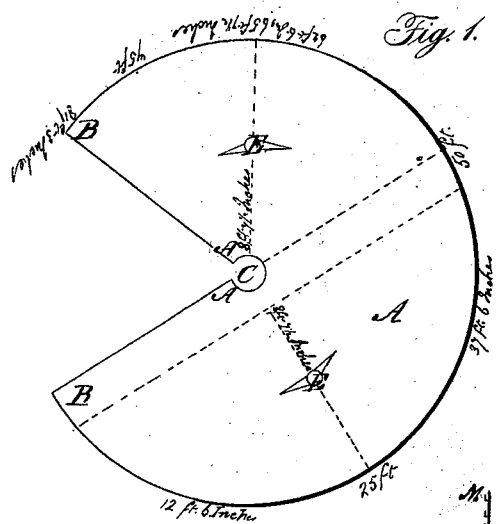
Fig. 1.
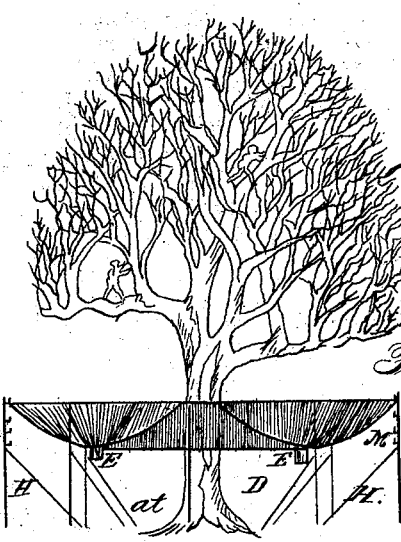
Fig. 3.
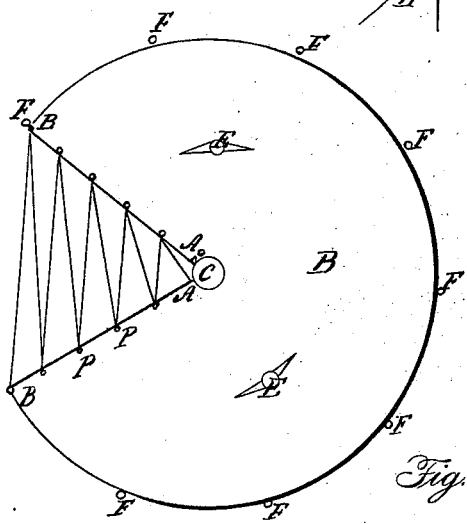
Fig. 2.
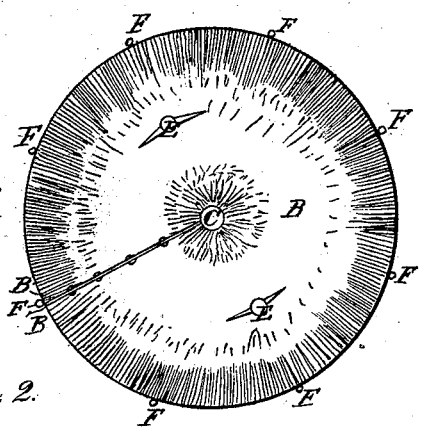
Witnesses:
William S Barker
Inventor:
Peter Collyer

UNITED STATES PATENT OFFICE.

PETER COLLYER, OF HUNTER, NEW YORK.

IMPROVEMENT IN FRUIT-GATHERERS.

Specification forming part of Letters Patent No. 5,156, dated June 12, 1847.

*To all whom it may concern:*

Be it known that I, PETER COLLYER, of Hunter, in the county of Greene and State of New York, have invented a new Fruit-Gatherer for Apples and other Kinds of Fruit Growing on Trees; and I do hereby declare that the following is a full and exact description.

The nature of my invention consists in providing a quantity of coarse muslin or canvas or netting constructed in such a manner as when completed will form one sheet, of which the diameter will be twenty-six feet and the circumference eighty-one feet three inches when used with the middle or center part raised to a level with the outside edges, thus forming a bag-like or hollow position for its purpose of gathering fruit.

To enable others skilled in the art to make and use my invention, I will proceed to describe its construction and operation.

I construct this muslin or canvas or netting by sewing a quantity of it together and bind it all around with a strong cord, as well upon the inside as upon the outside edges thereof, so as to form one sheet of (or any other size wanting, according to the same rule) thirty-two feet in diameter and thirteen-sixteenths ($\frac{13}{16}$ of 100 feet) of one hundred feet in circumference, with the exception marked C in the center of said sheet and the two holes or trunks marked E, as shown at A, Plate 1 (one,) Figure 1, in the accompanying drawings; and in the accompanying drawings, as shown at B, Plate 2, (two,) Fig. 2, the opening A A and B B show that they are intended to be laid and brought together, which, when done, will make the diameter twenty-six feet and the circumference eighty-one feet three inches, thereby forming the sheet or canvas in a hollow or bag-like position, with two holes or trunks (marked E) for the fruit, when shook from the tree, to discharge through into bags, barrels, or any other kind of a receiver. This circumference is divided into eight equal parts, ten feet one inch and seven-eighths for each part. At each of these parts fasten a ring or loop (marked F) in the outer edge of the said sheet or cord, for the purpose that they may be hooked or fastened to uprights or posts, as shown at D, Plate 3, (three,) Fig. 3, in the next accompanying drawing, with the said sheet eight feet from the ground. I surround the trunk of the tree and fasten it with a lacer at C. Spread the rest under its fruit. Fasten or hook F eight feet from the ground to uprights or posts placed there for the purpose, set in the ground with braces upon their insides. Place bags, barrels, &c., under E. One or more men will ascend the tree. With the lacer draw A A and B B close together. Let the men named shake the fruit from said tree, and the same will be very easy and at once gathered.

The drawing as shown at A, Plate 1, Fig. 1, represents a sheet of muslin or canvas or netting thirty-two feet in diameter and thirteen-sixteenths of one hundred feet in circumference. To draw the surface of this plate or shape of sheet, set one point of your compasses, or, say, take a strip of board or a line sixteen feet long. Fasten it at C and the other point or end at B, so that you stand facing C and your left hand to the open space between B B. Strike the line until you connect B B round to your right a circumference distance of eighty-one feet three inches. Then with a straight line connect said B and A upon the same side till within one foot three inches of C. Make the straight on the opposite side from B to A the same. Then spread your compasses fifteen inches. Set one point at C and the other at A. Strike the circle A A. Again spread your compasses eight feet seven and one-half inches. Set one point at C and with the other range out on dotted line twenty-five feet, marked at E. Here make one trunk-hole eight inches in diameter. With the same spread of compasses from C reach E on the dotted line sixty-five feet seven and one-half inches. At said E make another trunk-hole eight inches in diameter. At both of the trunk-holes, and on each side of them in a circumference direction, cut open the sheet two feet in length, and work in a gore four inches wide at one end to a point at said two feet in length. Begin at one B. Measure on the circumference line twelve feet six inches. Make a mark. Again measure, and add to twenty-five feet; mark; again the same to thirty-seven feet six inches; again to fifty feet; again to sixty-two feet six inches; again to sixty-five feet seven and one-half inches. Again add and mark at seventy-five feet, and at B you then meet with eighty-one feet three inches. This is done to show the division for trunk E. Make trunk E one foot in length, four inches in diameter at the lower end. Said sheet of muslin or canvas or netting must be bound all round, as well upon the inside as upon the outside edges, with a good, strong cord. With one hundred and eighteen feet of good one half-inch cord, take sixty-two yards one-yard wide muslin or canvas or netting. With one corner begin at B, and lay the one edge of your border of said muslin, &c. Pass A and C in a straight line out to fifty feet. There cut by the circumference-line. (For first border notice dotted line at A.) Then work on both ways. Lap the edges of your border one inch. Sew them with a double seam, like sails of vessels are made, until you have closed the whole of the form of sheet, as shown at A. The above refers to and explains at A, Plate 1, Fig. 1, and connected to my design for a fruit-gatherer, and is part thereof.

Reference to B, Plate 2, Fig. 2, (this plate partly representing and fully accompanying that shown at A:) In addition to that, this shows where A A and B B are intended to be laced together. Make six eyelet-holes on each side from A to B, as those two marked P. Make two eyelet-holes one foot three inches from A on the circle round C, to use in case the trunk of the tree requires it. Have a good one-half-inch lacer twenty-five feet long. When you begin to lace always begin at A A. Make eight loops or rings, say two inches in diameter, as F. Divide the circumference of the sheet or canvas round from B B (being eighty-one feet three inches) into eight equal parts. At each part fasten one loop or ring, as F, making the distance from each F to F ten feet one inch and seven-eighths of an inch. The loop or rings F are for the purpose of hooking to uprights or posts, as will appear at D, Plate 3, Fig. 3. In the dark drawing and accompanying at B is shown A A and B B are laced together, thereby bringing the whole circumference to eighty-one feet three inches and the diameter to twenty-six feet, thus forming the sheet or canvas in a hollow or bag-like position. Always bear in mind that the circle at C must be placed round the trunk of the tree eight feet from the ground, or certainly at a level with the loop or ring F, so as to form the bottom of the hollow, or, say, bag of the sheet or canvas, directly in circumference with the trunk E.

Reference to D, Plate 3, Fig. 3: In this plate, (which is accompanying Plates 1 and 2,) at D, is shown the sheet of muslin or canvas or netting in its proper projection, ready put up, except the bags or barrels, &c., under E. Make eight posts, as G, eight feet six inches long, two and one-half inches square. Chamfer the corners. Make eight (of three-eighths iron) pikes six inches long, as N. In the foot of each post drive one three inches, thus leaving three inches out to go in the ground. Make thirty-two iron hooks of one-fourth-inch iron, as M, three inches each point. Draw one point a little to drive. Say set the lower one in G five feet two inches from its foot, the second six feet, the third seven feet, and the fourth and top one eight feet. Serve all the posts the same way. Make eight braces, as H, seven feet one inch long, two inches square. Cut one end of each like the foot of a brace. Make eight of one-fourth-inch iron pikes five inches long, as O. Drive one in the foot of each brace two inches (square in its foot) deep. Leave three inches out to go in the ground. Get eight two-inch cast-iron butts with these and screws for the purpose. Fasten one H to each G five feet up from its foot upon the same side with the hook M.

As shown, Plate 2 at B, Fig. 2, dark drawing, loosen your lacer and open A A and B B. Bring the said sheet under the tree at D. Surround its trunk with C. With one end of your lacer fasten C as high from the ground as you intend to hook to G—say eight feet—or as low as five feet two inches; but always place on a level with where you hook F to G. About fourteen feet from the center of the trunk of the tree set G with its pike in the ground. With H extending to said tree, hook F to M, and so the next till you have set and hooked all of F to as many as G. Always place G apart the distance F requires. One or more men will ascend the tree; likewise, one man will stay on the ground. Draw the lacer and close A A and B B together, as shown at D. Place bags, barrels, &c., under E; The men in the tree will shake off its fruit, and the same will be very easily and quickly gathered.

All the foregoing is accompanying all other papers sent before in same case.

What I claim as my invention, and desire to secure by Letters Patent, is—

The mode described of constructing a new fruit-gatherer for apples and other fruit growing on trees.

Dated at Hunter, May 8, 1847.

PETER COLLYER.

Witnesses:
WILLIAM S. BURHANS,
CYRUS. BURHANS.